(12) United States Patent
Adjabeng

(10) Patent No.: US 11,623,163 B2
(45) Date of Patent: Apr. 11, 2023

(54) FALLING FILM EVAPORATOR SYSTEM AND METHODS

(71) Applicant: Ecodyst, Inc., Apex, NC (US)

(72) Inventor: George Adjabeng, Apex, NC (US)

(73) Assignee: Ecodyst, Inc., Apex, NC (US)

( * ) Notice: Subject to any disclaimer, the term of this patent is extended or adjusted under 35 U.S.C. 154(b) by 0 days.

(21) Appl. No.: 17/290,578

(22) PCT Filed: Oct. 30, 2019

(86) PCT No.: PCT/US2019/058761
§ 371 (c)(1),
(2) Date: Apr. 30, 2021

(87) PCT Pub. No.: WO2020/092501
PCT Pub. Date: May 7, 2020

(65) Prior Publication Data
US 2021/0402317 A1    Dec. 30, 2021

Related U.S. Application Data

(60) Provisional application No. 62/753,563, filed on Oct. 31, 2018.

(51) Int. Cl.
*B01D 1/06* (2006.01)
*B01D 1/00* (2006.01)
(Continued)

(52) U.S. Cl.
CPC .......... *B01D 1/065* (2013.01); *B01D 1/0082* (2013.01); *B01D 1/22* (2013.01); *B01D 5/006* (2013.01)

(58) Field of Classification Search
CPC ........ B01D 1/0082; B01D 1/065; B01D 1/22; B01D 5/006
See application file for complete search history.

(56) References Cited

U.S. PATENT DOCUMENTS

| 3,332,468 A | * | 7/1967 | Dietze | B01F 35/90 |
| | | | | 165/118 |
| 3,505,172 A | * | 4/1970 | Achener | C02F 1/045 |
| | | | | 159/13.1 |

(Continued)

FOREIGN PATENT DOCUMENTS

| GB | 872192 A | 7/1961 |
| WO | WO 2016/201223 A1 | 12/2016 |
| WO | WO 2018/187276 A1 | 10/2018 |

OTHER PUBLICATIONS

Notice of Publication corresponding to European Patent Application No. 19878942.2-1101 dated Aug. 11, 2021.

(Continued)

*Primary Examiner* — Jonathan Miller
(74) *Attorney, Agent, or Firm* — KDW Firm PLLC

(57) ABSTRACT

Falling film evaporator systems, devices, and methods are disclosed in the present application. In some embodiments, the falling film evaporator system can include a hollow cylindrical glass tube configured to enclose the major parts of the falling film evaporator system. Furthermore, in some embodiments, inserted into the cylindrical glass tube is another hollow evaporator tube with a dispensing bowl at the top, a reservoir of the dispending bowl facing the inside top of the cylindrical glass tube. Inserted into the hollow evaporator tube is a heating element configured to heat the hollow evaporator tube such that an outside surface of the evaporator tube is heated. At the top of the hollow cylindrical glass is an inlet where liquid flows into the dispensing bowl, spilling over the edges of the bowl, generating a thin film of liquid that is evaporated as it falls down the outside surface of the evaporator tube.

18 Claims, 14 Drawing Sheets

(51) Int. Cl.
  *B01D 1/22* (2006.01)
  *B01D 5/00* (2006.01)

(56) References Cited

U.S. PATENT DOCUMENTS

| | | | | |
|---|---|---|---|---|
| 3,950,216 A * | 4/1976 | Bruns | ............... | B01D 1/22 159/13.1 |
| 4,089,662 A * | 5/1978 | Williams | ............... | B01D 1/22 196/132 |
| 4,167,454 A * | 9/1979 | Feres | ............... | B01D 1/222 159/DIG. 1 |
| 4,545,853 A * | 10/1985 | Feres | ............... | B01D 1/223 159/7 |
| 4,759,825 A * | 7/1988 | Medvey | ............... | B01D 3/085 202/205 |
| 5,112,442 A | 5/1992 | Goodson | | |
| 5,624,531 A * | 4/1997 | Knuutila | ............... | D21C 11/10 159/43.1 |
| 9,375,654 B1 | 6/2016 | Gilliam et al. | | |
| 2006/0112882 A1 | 6/2006 | Suzuki et al. | | |
| 2010/0288640 A1 * | 11/2010 | Jachuck | ............... | B01J 19/1887 204/519 |
| 2014/0105785 A1 * | 4/2014 | Hill | ............... | A61L 2/20 422/111 |
| 2016/0288015 A1 | 10/2016 | Allen et al. | | |
| 2017/0252668 A1 | 9/2017 | Adjabeng et al. | | |

OTHER PUBLICATIONS

International Search Report and the Written Opinion of the International Searching Authority corresponding to International application No. PCT/US 2019/058761 dated Jan. 27, 2020.

Notice of Publication Corresponding to International application No. PCT/US 2019/058761 dated May 7, 2020.

International Preliminary Report on Patentability Corresponding to International application No. PCT/US 2019/058761 dated Apr. 27, 2021.

Extended European Search Report corresponding to European Patent Application No. 19878942.2-1101 dated May 19, 2022.

* cited by examiner

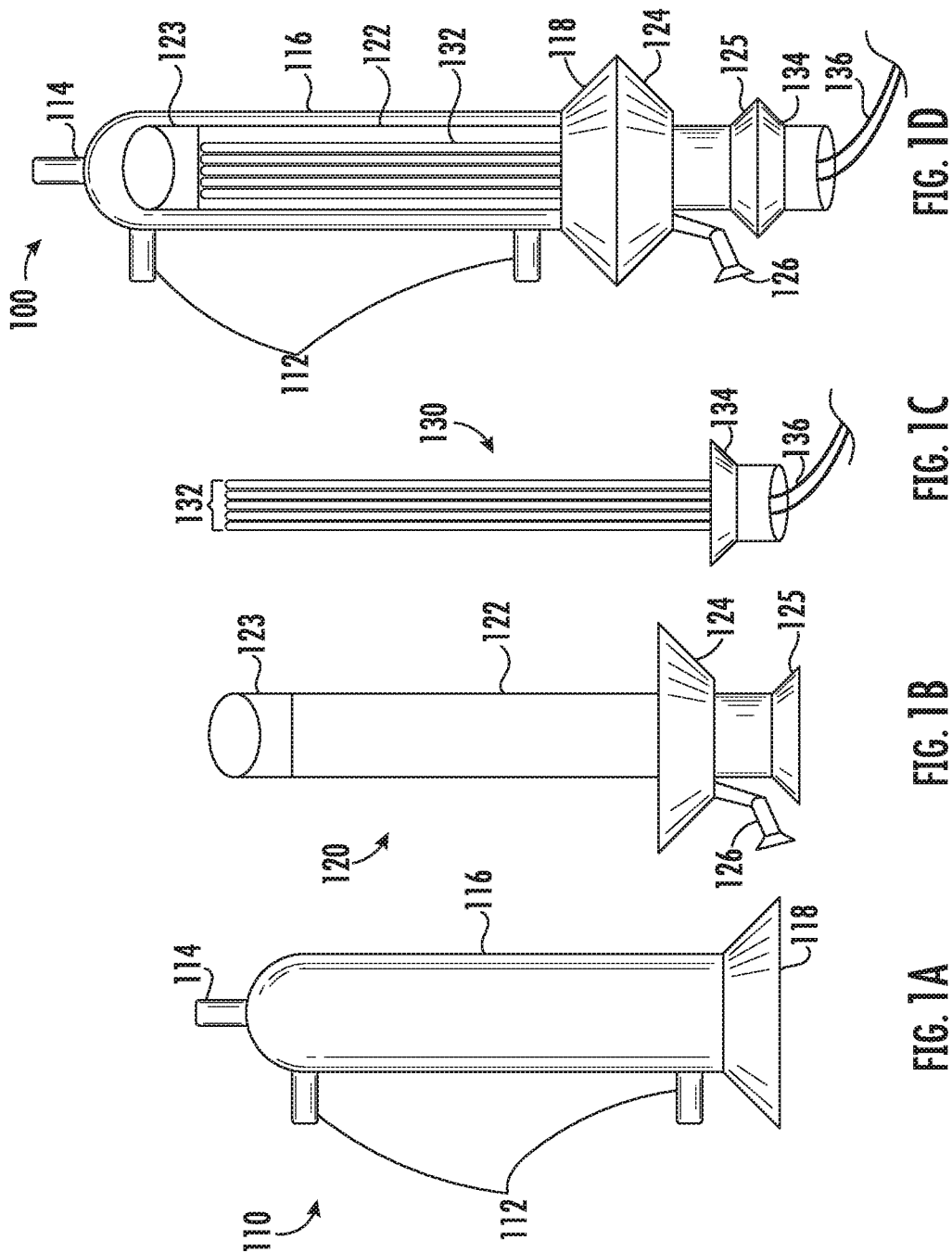

FALLING FILM EVAPORATOR SYSTEM AND METHODS

CROSS-REFERENCE TO RELATED APPLICATIONS

This patent application is a § 371 U.S. National Phase of International Patent Application No. PCT/US2019/058761, filed Oct. 30, 2019, which claims the benefit of and priority to U.S. Provisional Patent Application Ser. No. 62/753,563, filed Oct. 31, 2018, the entire disclosures of each of which are incorporated herein by reference in their entireties.

TECHNICAL FIELD

The subject matter disclosed herein relates generally to evaporator systems. More particularly, the subject matter disclosed herein relates to falling film evaporators.

BACKGROUND

Evaporators are devices used to turn a liquid substance into its gaseous form, or vapor. During the evaporation process, the temperature of the liquid substance is raised to a point such that it is evaporated or vaporized into a gaseous form. There are several different types of evaporators that perform this function including rotary evaporators and falling film evaporators. One major drawback of rotary evaporators is that they are limited as to the quantity of liquid they can attempt to evaporate. For example, in some 50 L rotary evaporators, up to 50 L of a sample liquid can be placed into the evaporator port to be evaporated. However, with a falling film evaporator, the sample of liquid to be evaporated is supplied to the evaporator in a continuous fashion such that there is a thin film of the liquid sample continuously flowing down a tube of the evaporator, the continuously flowing film being turned into vapor. Thus, in some instances, it is ideal to utilize a falling film evaporator over a rotary evaporator because of the greater throughput of liquid sample that can be evaporated by the falling film evaporator.

In conventional falling film evaporators, multiple small-diameter tubes are constructed inside a larger tube such that the liquid sample flows down and inside of the multiple small-diameter tubes. The multiple small-diameter tubes are heated by supplying steam or hot oil to the larger tube wherein the heat from the steam or oil is transferred to the multiple small-diameter tubes and the liquid sample inside the multiple small-diameter tubes is then turned into vapor. However, the conventional falling film evaporators have some significant drawbacks, especially with respect to energy utilization, resource consumption, and cost to operate. Conventional falling film evaporators use a significant amount of power, in some instances, in the range of 24 kW to 60 kW. Furthermore, conventional falling film evaporators utilize a significant amount of water for steam. Some labs have reported spending upwards of $1,000.00 per month on water for use with conventional falling film evaporators.

Demand for falling film evaporators has significantly increased, especially in certain fields such as the medicinal and recreational *cannabis* industries. However, as discussed above, the energy and other resource consumption of conventional designs for the falling film evaporators add significant cost to labs and make them cost prohibitive. With the subject matter of the present disclosure, an improved design for a falling film evaporator system is provided. The falling film evaporator system disclosed hereinbelow was designed to not only be more energy efficient, but also reduce resource utilization and reduce the complexity of the design of conventional falling film evaporators.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In accordance with this disclosure, systems and methods for falling film evaporators are provided. In one aspect, a falling film evaporator system is provided, the system comprising one or more sample feed inlets; an evaporator glass comprising one or more vapor outlets; an evaporator tower positioned at least partially inside of the evaporator glass and comprising: an evaporator body; and a dispensing bowl or an egress hole positioned on top of the evaporator body and between the evaporator body and a top inner surface of the evaporator glass; and a heating element positioned at least partially inside of the evaporator body.

In another aspect of the present disclosure, the evaporator tower comprises the dispensing bowl; wherein the one or more sample feed inlets is positioned on top of the evaporator glass and is configured to deposit sample liquid into a reservoir of the dispensing bowl.

In another aspect of the present disclosure, the evaporator tower is configured such that upon an overflow of the sample liquid in the dispensing bowl, the sample liquid falls along an outer surface of the evaporator body.

In another aspect of the present disclosure, the evaporator tower comprises the egress hole; wherein the egress hole is fed by one or more sample feed inlets located at a bottom portion of the evaporator tower.

In another aspect of the present disclosure, the evaporator tower is configured such that upon an overflow of sample liquid out of the egress hole, the sample liquid falls along an outer surface of the evaporator body.

In another aspect of the present disclosure, the evaporator glass further comprises a first flange; wherein the evaporator tower further comprises a second flange and a third flange; wherein the heating element comprises a fourth flange; wherein the evaporator tower is positioned at least partially inside of the evaporator glass such that the first flange of the evaporator glass is positioned on top of the second flange of the evaporator tower; and wherein the heating element is positioned at least partially inside of the evaporator body such that the third flange of the evaporator tower is positioned on top of the fourth flange of the heating element.

In another aspect of the present disclosure, the evaporator tower further comprises a collar configured to capture any sample liquid that is falling along the outer surface of the evaporator body that does not evaporate; and wherein the second flange is configured to capture any liquid that is sliding or falling down the evaporator glass.

In another aspect of the present disclosure, the heating element is configured to heat the evaporator body such that sample liquid falling along an outer surface of the evaporator body is at least partially evaporated.

In another aspect of the present disclosure, the falling film evaporator system further comprises one or more concentrate drain ports; and one or more concentrate receiving flasks, or one or more separators connected to one or more of the concentrate drain ports.

In another aspect of the present disclosure, at least one of the one or more vapor outlets is connected to a condenser.

In another aspect of the present disclosure, the falling film evaporator system further comprises a vacuum pump; and a controller comprising one or more processors configured to control one or more components of the evaporator glass, the evaporator tower, the heating element, or the vacuum pump.

In another aspect of the present disclosure, the evaporator tower and the evaporator glass are configured to be sealed and unsealed to create a vacuum chamber.

In another aspect of the present disclosure, the evaporator glass, the evaporator tower, and the heating element are all substantially vertically oriented.

In another aspect of the present disclosure, a method for evaporating a sample liquid is provided, the method comprising: providing an evaporator glass comprising one or more vapor outlets; providing an evaporator tower positioned at least partially inside of the evaporator glass and comprising: an evaporator body; and a dispensing bowl or an egress hole positioned on top of the evaporator body and between the evaporator body and a top inner surface of the evaporator glass; dispensing the sample liquid from one or more sample feed inlets into a reservoir of the dispensing bowl or dispensing the sample liquid from the egress hole, wherein the evaporator body is configured such that the sample liquid can overflow and fall along an outer surface of the evaporator body; and heating the evaporator body with a heating element positioned at least partially inside of the evaporator body wherein the sample liquid is at least partially evaporated as it falls along the outer surface of the evaporator body.

In another aspect of the method of the present disclosure, the evaporator tower comprises the dispensing bowl; and the sample feed inlet is positioned on top of the evaporator glass.

In another aspect of the method of the present disclosure, the evaporator tower comprises the egress hole; and the egress hole is fed by one or more sample feed inlets located at a bottom portion of the evaporator body.

In another aspect of the method of the present disclosure, the evaporator glass further comprises a first flange; wherein the evaporator tower further comprises a second flange and a third flange; wherein the heating element comprises a fourth flange; wherein the evaporator tower is positioned at least partially inside of the evaporator glass such that the first flange of the evaporator glass is positioned on top of the second flange of the evaporator tower; and wherein the heating element is positioned at least partially inside of the evaporator body such that the third flange of the evaporator tower is positioned on top of the fourth flange of the heating element.

In another aspect of the present disclosure, the method further comprises providing the evaporator tower with one or more concentrate drain ports; and connecting one or more concentrate receiving flasks or one or more separators to one or more of the concentrate drain ports.

In another aspect of the present disclosure, the method further comprises connecting at least one of the one or more vapor outlets to a condenser.

In another aspect of the present disclosure, the method further comprises using a vacuum pump to seal and unseal the evaporator tower and the evaporator glass to create a vacuum chamber; and using a controller comprising one or more processors to control one or more components of the evaporator glass, the evaporator tower, the heating element, or the vacuum pump.

In another aspect of the method of the present disclosure the evaporator glass, the evaporator tower, and the heating element are all substantially vertically oriented.

In yet another aspect of the present disclosure a falling film evaporator system is provided, the falling film evaporator comprising: one or more sample feed inlets; an evaporator glass comprising: a first flange; and one or more vapor outlets; an evaporator tower positioned at least partially inside of the evaporator glass and comprising: an evaporator body; a dispensing bowl or an egress hole positioned on top of the evaporator body, between the evaporator body and a top inner surface of the evaporator glass, and further positioned such that the one or more sample feed inlets can: dispense a sample liquid into a reservoir of the dispensing bowl; or feed a sample liquid through the egress hole and from a sample feed inlet at the bottom of the evaporator tower; a second flange and a third flange; and one or more concentrate drain ports; wherein the evaporator tower is positioned at least partially inside of the evaporator glass such that the first flange of the evaporator glass is positioned on top of the second flange of the evaporator tower; a heating element positioned at least partially inside of the evaporator body and comprising a fourth flange, wherein the heating element is positioned at least partially inside of the evaporator body such that the third flange of the evaporator tower is positioned on top of the fourth flange of the heating element; a vacuum pump configured to seal and unseal the evaporator tower and the evaporator glass to create a vacuum chamber; a controller comprising one or more processors, in communication with one or more the heating element or the vacuum pump, and configured to control the heating element or the vacuum pump or both; a cooling condenser connected to a first concentrate receiving flask via a first connection and the evaporator glass via the one or more vapor outlets; and a second concentrate receiving flask, or a separator connected to the concentrate drain port and the cooling condenser via a second connection; wherein the evaporator tower is configured such that upon an overflow of sample liquid in the dispensing bowl or the egress hole, the sample liquid falls along an outer surface of the evaporator body; and wherein the heating element is configured to heat the evaporator body such that the sample liquid falling along the outer surface of the evaporator body is at least partially evaporated.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIG. 1A, FIG. 1B, FIG. 1C, and FIG. 1D are schematic drawings illustrating the various components of the falling film evaporator system of the present disclosure;

DETAILED DESCRIPTION

Figure 2C:
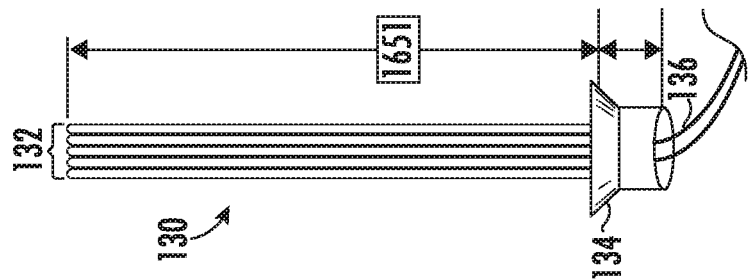
FIG. 2A, FIG. 2B, and FIG. 2C are schematic drawings illustrating various dimensions and sizes of the main components of the falling film evaporator system of the present disclosure.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Provided hereinbelow are falling film evaporator systems and methods designed to reduce the complexity, energy utilization, and resource utilization of conventional falling film evaporator systems. The falling film evaporator system of the present disclosure improves on the conventional design by utilizing one large tube for the liquid sample to flow and/or fall down and a heating element inserted at least partially inside of the one large tube, instead of steam, for evaporating the liquid sample. The larger evaporator tube has a significantly larger surface area than the multiple small-diameter tubes of conventional falling film evaporators.

The evaporator tube (termed evaporator tower) of the present disclosure can be housed inside another chamber, an evaporator glass. The evaporator tube of the present disclosure and the evaporator glass can be configured such that they can be sealed and unsealed in order to create a vacuum chamber. Furthermore, the falling film evaporator system of the present disclosure comprises, in some embodiments, a heating element inserted, at least partially, inside of the evaporator tube. The heating element can be configured to heat the evaporator tube from the inside such that an outer surface of the evaporator tube is heated to a point where the liquid sample flowing/falling down the outer surface of the evaporator tube is evaporated.

The disclosure hereinbelow provides designs for an improved falling film evaporator system and method. While the following terms are believed to be well understood by one having ordinary skill in the art, the following definitions are set forth to facilitate explanation of the presently disclosed subject matter.

Unless defined otherwise, all technical and scientific terms used herein have the same meaning as commonly understood to one having ordinary skill in the art to which the presently disclosed subject matter belongs. Although, any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a heat exchanger" can include a plurality of such heat exchangers, and so forth.

Unless otherwise indicated, all numbers expressing quantities of length, diameter, width, and so forth used in the specification and claims are to be understood as being modified in all instances by the terms "about" or "approximately". Accordingly, unless indicated to the contrary, the numerical parameters set forth in this specification and attached claims are approximations that can vary depending upon the desired properties sought to be obtained by the presently disclosed subject matter.

As used herein, the terms "about" and "approximately," when referring to a value or to a length, width, diameter, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed apparatuses and devices.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

FIG. 1A-FIG. 10 illustrate the main components of one example embodiment of a falling film evaporator system 100 of the presently disclosed subject matter. In some embodiments of the present disclosure, the falling film evaporator system 100 comprises an evaporator glass 110, an evaporator tower 120, and a heating element 130. As illustrated in FIG. 1D, in some embodiments, the evaporator tower 120 is positioned at least partially inside of the evaporator glass 110, and the heating element 130 is positioned at least partially inside of the evaporator tower 120.

Turning particularly now to FIG. 1A, in some embodiments, the evaporator glass 110 can be made from any suitable material and allows the evaporator glass 110 to operate as described herein and also create and maintain a vacuum seal. For example and without limitation, in some embodiments, the evaporator glass 110 can be made of standard silicate glass or poly(methyl methacrylate) (PMMA), or acrylic glass. In some embodiments, the evaporator glass 110 can have a cylindrically shaped evaporator glass body 116 with a semi-hemispherical first end, or cap, and a second end that is open to the inside of the hollow evaporator glass 110. In some embodiments, the second end that is open can comprise a first flange 118 so as to allow it to be attached to other flat surfaces such as, for non-limiting example, a second flange 124 of the evaporator tower 120 as shown in FIG. 1D. In some embodiments, the evaporator glass 110 can have a box, square prism, or rectangular prism shape. In some embodiments, the evaporator glass 110 can have any reasonable shape that allows the falling film evaporator system 100 to operate as described hereinbelow.

In some embodiments, the evaporator glass 110 comprises one or more vapor outlets 112, one or more sample liquid inlets 114, and some mechanism to maintain a vacuum seal between the evaporator glass 110 and the evaporator tower 120. In some embodiments, any of the first flange 118, second flange 124, third flange 125, and/or fourth flange 134 can be sealed together, with their respective corresponding connecting flanges (i.e., first flange 118 connecting to second flange 124, and third flange 125 connecting with fourth flange 134), to create a vacuum seal using a vacuum pump (not shown) and various seals, binders, clamps, and/or attachments of the flanges, as understood by those having ordinary skill in the art. In embodiments where the evaporator glass 110 is cylindrical, rectangular, or box shaped, the evaporator glass 110 can have a plurality of sample liquid inlets 114 spaced apart with respect to one another across the first end of the evaporator glass 110. In some embodiments, the evaporator glass 110 can have a clear or transparent color (i.e. appear like traditional glass) or it can be translucent or be tinted any suitable color according to the liquids a falling film evaporator system 100 of the present disclosure is being used to evaporate.

Turning now to FIG. 1B, in some embodiments, the falling film evaporator system 100 of the present disclosure comprises one or more evaporator towers 120 that are configured to be inserted inside of the evaporator glass 110. In some embodiments, the evaporator tower 120 can be substantially cylindrical in shape and be as long as, shorter than, or longer than the evaporator glass 110. In some embodiments, the evaporator tower 120 is rectangular or box-shaped and is dimensioned such that it can fit inside of the evaporator glass 110. In some embodiments, the evaporator tower 120 can be any suitable shape such that it can fit inside the evaporator glass 110 and form a vacuum seal. In some embodiments, the evaporator tower 120 comprises a second flange 124 that is configured such that the evaporator glass 110 can be slid over a first end of the evaporator tower 120 and be attached to the second flange 124 of the evaporator tower 120 via the first flange 118 of the evaporator glass 110. In this way, the vacuum seal described earlier can be created by sealing at least a portion of the evaporator tower 120 inside the evaporator glass 110 using connection devices of the first flange 118 and the second flange 124. In some embodiments, if multiple evaporator towers 120 are used, the multiple evaporator towers 120 are connected such that a vacuum seal can still be created by the first flange 118 and the second flange 124. Additionally, in some embodiments, the evaporator tower body 122 is hollow and large/wide enough that a heating element 130 or other suitable heating device can be inserted into it.

In some embodiments, the evaporator tower 120 comprises, at a second end, opposite the first end, a third flange 125 that allows the evaporator tower 120 to sit on top of the heating element 130. In some embodiments, the evaporator tower 120 also comprises one or more concentrate drain ports 126 connected at the second flange 124. The concentrate drain port 126 can be used to drain concentrate sample liquid that was not evaporated as the liquid fell down the evaporator tower 120.

In some embodiments, the evaporator tower 120 can be made from plastic, silicate glass, acrylic glass, metal, or any other suitable material with thermal properties that allow heat to be exchanged from an inner hollow section of the evaporator tower 120 (i.e., where the heating element 130 is inserted) to the outer surface of the body 122 of the evaporator tower 120. In some embodiments, the evaporator tower 120 can be made from any suitable material that allows heat that is generated by the heating element 130 inserted into the evaporator tower 120 to heat an outer surface of the evaporator tower body 122 to a predetermined temperature. For example and without limitation, the evaporator tower body 122 can be made from silicate glass that is thin enough and has suitable thermal properties such that heat generated within the hollow evaporator tower body 122 is transferred to the outer surface of the evaporator tower 120 body. As will be described in further detail hereinbelow, a thin film of sample liquid will fall or flow down the outer surface of the evaporator tower body 122 and the heat generated within the hollow body 122 must transfer enough to the outer surface of the evaporator tower body 122 such that the liquid is evaporated. As discussed hereinbelow, the heating element 130 is configured to be heated to a high enough temperature such that the heat that transfers through the walls of the hollow evaporator tower body 122 is hot enough to evaporate the falling fluid film.

In some embodiments, the evaporator tower 120 comprises at the first end a dispensing bowl 123, with the well or reservoir of the dispensing bowl 123 facing the top of the evaporator glass 110 when the evaporator tower 120 is inserted into the evaporator glass 110. In some embodiments, the dispensing bowl 123 is made of any suitable material that can hold and contain the sample liquid without deteriorating or being destroyed by the liquid. For example, the dispensing bowl 123 should not be made of a material that would be dissolved (or otherwise deformed) by the sample liquid. In some embodiments, the dispensing bowl 123 is dimensioned and shaped such that it can fit on top of the evaporator tower 120 and within the evaporator glass 110 when the vacuum seal is generated by the evaporator glass 110 and evaporator tower 120. As will be described further hereinbelow, the falling film evaporator system of the present disclosure can in some embodiments comprise a vacuum pump (not shown) that can be used to create a vacuum chamber between the evaporator glass 110 and the evaporator tower 120. Furthermore, in some embodiments, the dispensing bowl 123 is sized and shaped to allow sample liquid to fall down the outer surface or sides of the evaporator tower 120 body. In some embodiments, the dispensing bowl 123 can be round or substantially circular in shape or rectangular or square in shape. In some embodiments, a diameter or width of the dispensing bowl 123 is substantially equal to a diameter or width of the evaporator tower body 122. In some embodiments, the diameter or width of the dispensing bowl 123 is less than or equal to a diameter or width of the evaporator tower body 122.

Turning now to FIG. 10, in some embodiments, the falling film evaporator system 100 comprises a heating element 130 inserted inside the hollow portion of the evaporator tower body 122. In some embodiments, the heating element 130 comprises a fourth flange 134 near one end that allows the heating element 130 to be fastened to the third flange 125 of the evaporator tower 120. In some embodiments, the heating element 130 comprises one or more metal coils 132, metal ribbons, and/or metal strips of wire that give off heat when an electric current is flowing through them. In some embodiments, the one or more coils 132 are as long as or shorter than the length of the evaporator tower body 122. In some embodiments, the one or more coils 132 are long enough such that when the heating element 130 is inserted into the evaporator tower body 122, the ends of the one or more coils 132 are positioned substantially close to the base of the dispensing bowl 123. In some embodiments the heating element 130 is configured to utilize less than about 24 kW of power. In some other embodiments, the heating element 130 is configured to utilize an average of about 10 kW of power. In some embodiments, the heating element 130 is configured to produce enough heat that can transfer through the material of the evaporator tower body 122 and evaporate the liquid that is falling down the outer surface of the evaporator tower body 122.

In some embodiments, the amount of heat generated by the heating element 130, or the temperature of the heating element 130, is configured to be adjustable automatically by one or more processors (i.e., by a controller or by one or more processors integrated into the heating element itself) or manually by a user such that it can be adjusted to a variety of temperatures depending on the sample liquid being evaporated. In some embodiments, the heat emitted, or temperature of the heating element 130 is configured to be adjusted to between about 40° C. and 500° C. In some embodiments, the temperature of the heating element 130 ranges from between about, and including, 90° C. and 200° C. In some embodiments, the temperature of the heating element 130 ranges from between about, and including, 100° C. and 200° C. In some embodiments, the temperature of the heating element 130 ranges from between about, and including, 100° C. and 250° C. In some embodiments, the temperature of the heating element 130 ranges from between about, and including, 100° C. and 300° C. In some embodiments, the temperature of the heating element 130 ranges from between about, and including, 100° C. and 350° C. In some embodiments, the temperature of the heating element 130 ranges from between about, and including, 100° C. and 400° C. In some embodiments, the temperature of the heating element 130 ranges from between about, and including, 150° C. and 250° C. In some embodiments, the heating element 130 can be adjustably configured to produce enough heat to vaporize at least some or most liquids known to those having ordinary skill in the art as the liquid falls down the evaporator tower 120 of the falling film evaporator system 100. For example and without limitation, ethanol is a possible example sample liquid or solvent. Ethanol has a boiling point of approximately 78.37° C. (or about 173° F.). If ethanol was a sample liquid or solvent being evaporated by the falling film evaporator system 100 according to embodiments of the present disclosure, the heating element 130 would need to produce enough heat to heat the area around the evaporator tower body 122 to be equal to or greater than about 78.37° C. Additionally, in some embodiments, water is a possible example sample liquid. Water has a boiling point of approximately 100° C. (or about 212° F.) at 1 atmosphere. Therefore, in a similar way as ethanol, if water was a sample liquid being evaporated by the falling film evaporator system 100 according to embodiments of the present disclosure, the heating element 130 would need to produce enough heat to heat the area around the evaporator tower body 122 to be equal to or greater than about 100° C.

In most circumstances, it is ideal to have the temperature of the heating element 130 above the actual boiling temperature of the sample liquid, so as to ensure that the area surrounding the heating element 130 is at or above the boiling temperature of the liquid. Additionally, adjustments to temperatures and the heating element 130 have to be made based on the pressure inside the sealed falling film evaporator system 100. For example, water has a boiling temperature of 100° C. at 1 Atmosphere. However, at lower pressures, the boiling point of the water is below 100° C. Therefore, the temperature of the heating element 130 can in some embodiments be appropriately adjusted.

In some embodiments, the heating element 130 is configured to operate at a constant temperature of about 125° C. and is not adjustable. In some embodiments, the temperature and/or heat generated and/or power used by the heating element 130 is configured to be adjusted by one or more controllers comprising one or more processors. In some embodiments, the heating element 130 is configured to automatically shut off or power down or cool down once the falling film evaporator system 100 detects that no more sample liquid needs to be evaporated. Using some of the characteristics described herein, the falling film evaporator system 100 of the present disclosure has a power utilization that is roughly between one-sixth and one-half of the power utilization of conventional falling film evaporators. As shown in the figure, in some embodiments, the heating element 130 is powered by an electric cable 136 inserted into a power outlet that provides a suitable voltage and current to power the heating element 130.

FIG. 1D illustrates an example falling film evaporator system 100, wherein the heating element 130 is at least partially enclosed within the evaporator tower 120 and the combination of the heating element 130 and the evaporator tower 120 are at least partially enclosed within the evaporator glass 110, according to one embodiment of the present disclosure. In this particular embodiment, the heating element 130 is inserted into the hollow evaporator tower body 122 and the third flange 125 and fourth flange 134 that connect the evaporator tower 120 to the heating element 130 have been sealed together using suitable connections. Furthermore, the combined heating element 130 and evaporator tower 120 have been inserted into the hollow body 116 of the evaporator glass 110 and the first flange 118 and the second flange 124 that connect the evaporator glass 110 and the evaporator tower 120 have been sealed using suitable connections. This figure illustrates how the major parts of the falling film evaporator system 100 appear when combined together into one system.

Figure 2B:
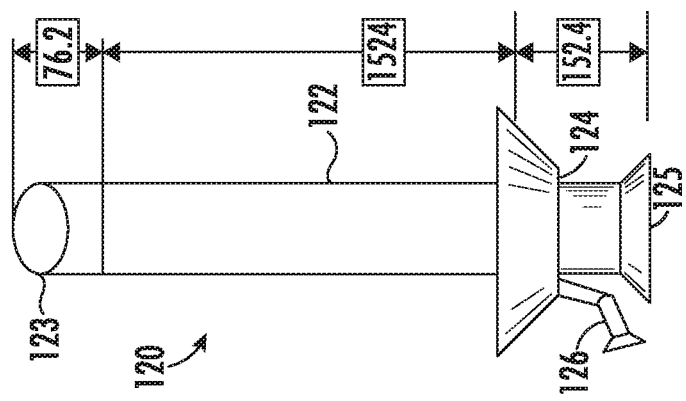
Figure 2A:
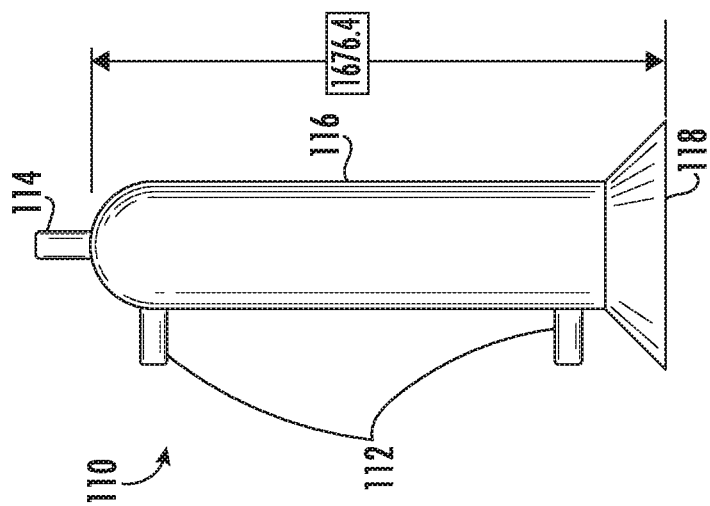

FIG. 2A, FIG. 2B, and FIG. 2C of the present disclosure illustrate different exemplary dimensions, in millimeters, of the several components described above. These dimensions are for illustrative and exemplary purposes only and are not intended to be limiting with respect to size, scale, or dimensions. For example and without limitation, as shown in FIG. 2A, in some embodiments, the evaporator glass 110 can have a glass thickness of between about 3 mm and 6 mm. In some embodiments, the evaporator glass 110 can have a glass thickness of about 5 mm. In some embodiments, the diameter of the evaporator glass 110 can be about 50 mm to about 400 mm, or in some embodiments about 200 mm, and the length of the evaporator glass 110 from the top of the cylindrical body 116 to the bottom of the first flange 118 can be about 1000 mm to about 2000 mm, in some embodiments approximately 1675 mm. In some embodiments, the first flange 118 can also be about 100 mm to about 300 mm in diameter, or in some aspects about 200 mm in diameter. Finally, in some embodiments, each of the inlet sample feed 114, and the vapor outlets 112 can have a diameter of about 10 mm to about 50 mm, or in some aspects approximately 25 mm.

Turning now to FIG. 2B, in some embodiments, the evaporator tower 120, from the first end to the second end (i.e. from the third flange 125 to the top of the dispensing bowl 123), can have a length that is approximately equal to the length of the evaporator glass 110, including the first flange 118. However, when the evaporator tower 120 is inserted into the evaporator glass 110 and is fastened to the first flange 118 of the evaporator glass 110, the amount that the evaporator tower 120 protrudes inside of the evaporator glass 110 is about 150 mm less than the evaporator tower's 120 total length. In other words, only about 1525 mm of the evaporator tower 120 (including the dispensing bowl 123) is positioned inside the evaporator glass 110 when the first flange 118 is attached to the second flange 124. Additionally, in some embodiments, the dispensing bowl 123 is approximately 76 mm tall. In some embodiments the glass or other material that makes up the evaporator tower body 122 of the evaporator tower 120 has a thickness of between about 2.75 mm and 3.25 mm. For example, and without limitation, in some embodiments, the thickness of the evaporator tower 120 material is approximately 3.05 mm. In some embodiments, the diameters of the evaporator tower body 122 and dispensing bowl 123 are substantially the same, their diameters being less than the diameter of the evaporator glass 110. For example and without limitation, in some embodiments, the evaporator tower body 122 and the dispensing bowl 123 each have a diameter of approximately 150 mm.

Turning now to FIG. 2C, in some embodiments, the heating element 130 is approximately the same length as the evaporator tower body 122, from the third flange 125 to the base of the dispensing bowl 123. For example and without limitation, in some embodiments, the heating element 130 coils 132 are approximately 1650 mm in length. Additionally, in some embodiments, the heating element coils 132 are arranged in a circular shape, the circular shape having a diameter that is less than the diameter of the evaporator tower body 122. For example and without limitation, in some embodiments, the diameter of the grouped heating element coils 132 is approximately 120 mm.

As noted herein, the above cited dimensions are for purposes of example and explanation only to show how the different parts of some embodiments of the present disclosure fit within each other and to give context to their relative sizes. These dimensions should not be construed as limiting in any way and various shapes, sizes, dimensions, and configurations are envisioned and within the scope of the present subject matter.

Figure 3:
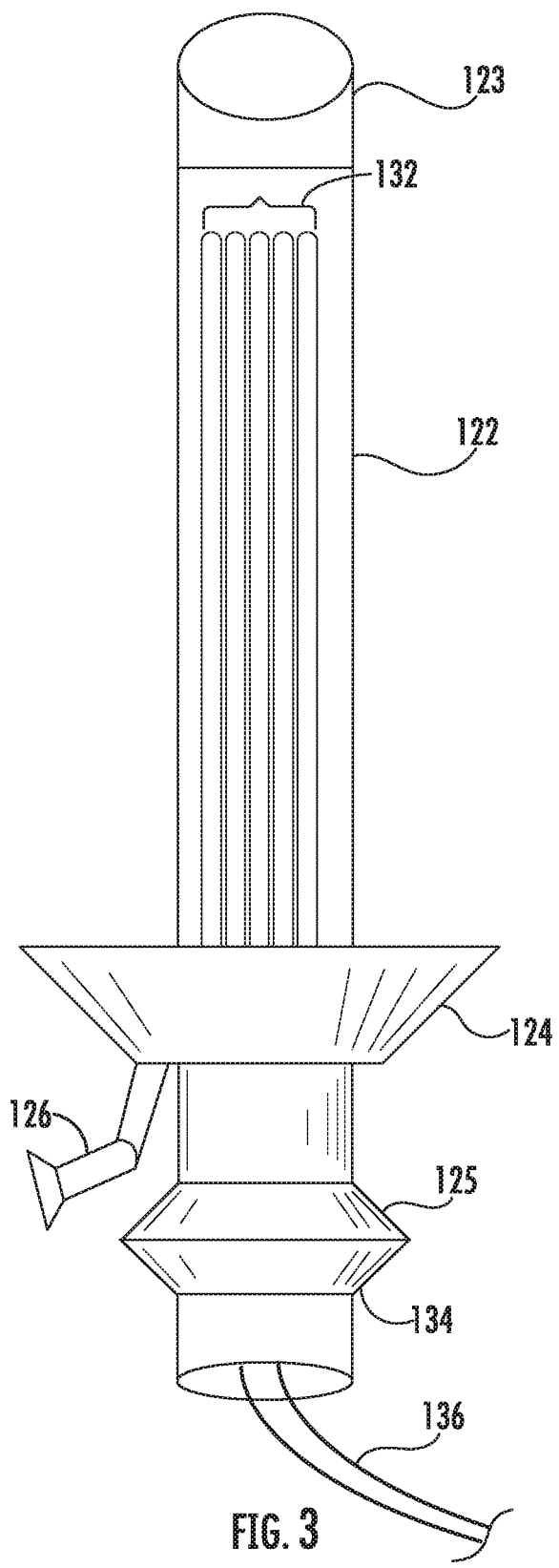
FIG. 3 is a schematic drawing of a close up of the heating element and evaporator tower of the falling film evaporator system of the present disclosure.

FIG. 3 illustrates the heating element 130 at least partially inserted into the evaporator tower 120 and gives more detail in terms of what each of the components comprises. As illustrated in FIG. 3, in some embodiments, the heating element 130 comprises one or more power cords 136. In some embodiments, the one or more power cords 136 are selected appropriately to provide an adequate voltage and current necessary to power the coils 132 as described herein. The heating element 130 is positioned at least partially inside of the body 122 of the evaporator tower 120 and the evaporator tower 120 can be fastened to the heating element 130 by any suitable fastening mechanism, including for example by securing the third flange 125 of the evaporator tower 120 to the fourth flange 134 of the heating element 130. In some embodiments, the falling film evaporator system 100 of the present disclosure can be vertically oriented, or at least substantially vertically oriented. In other embodiments, it can be horizontally oriented, or at least substantially horizontally oriented.

Figure 4:
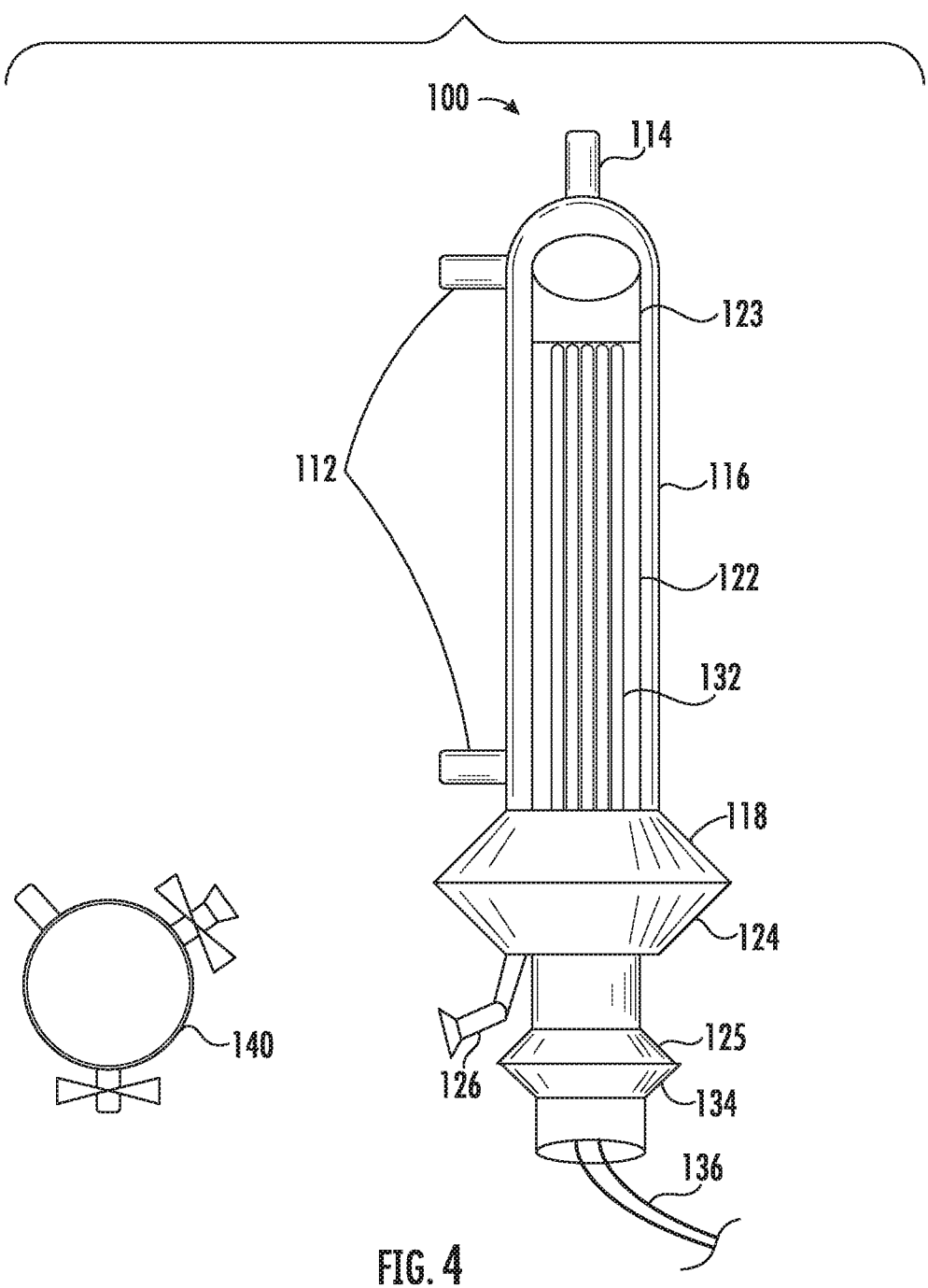
FIG. 4 is a schematic drawing of the heating element, evaporator tower, and evaporator glass of the falling film evaporator system, encapsulated together, as described hereinbelow, as well as a concentrate receiving flask.
Figure 5:
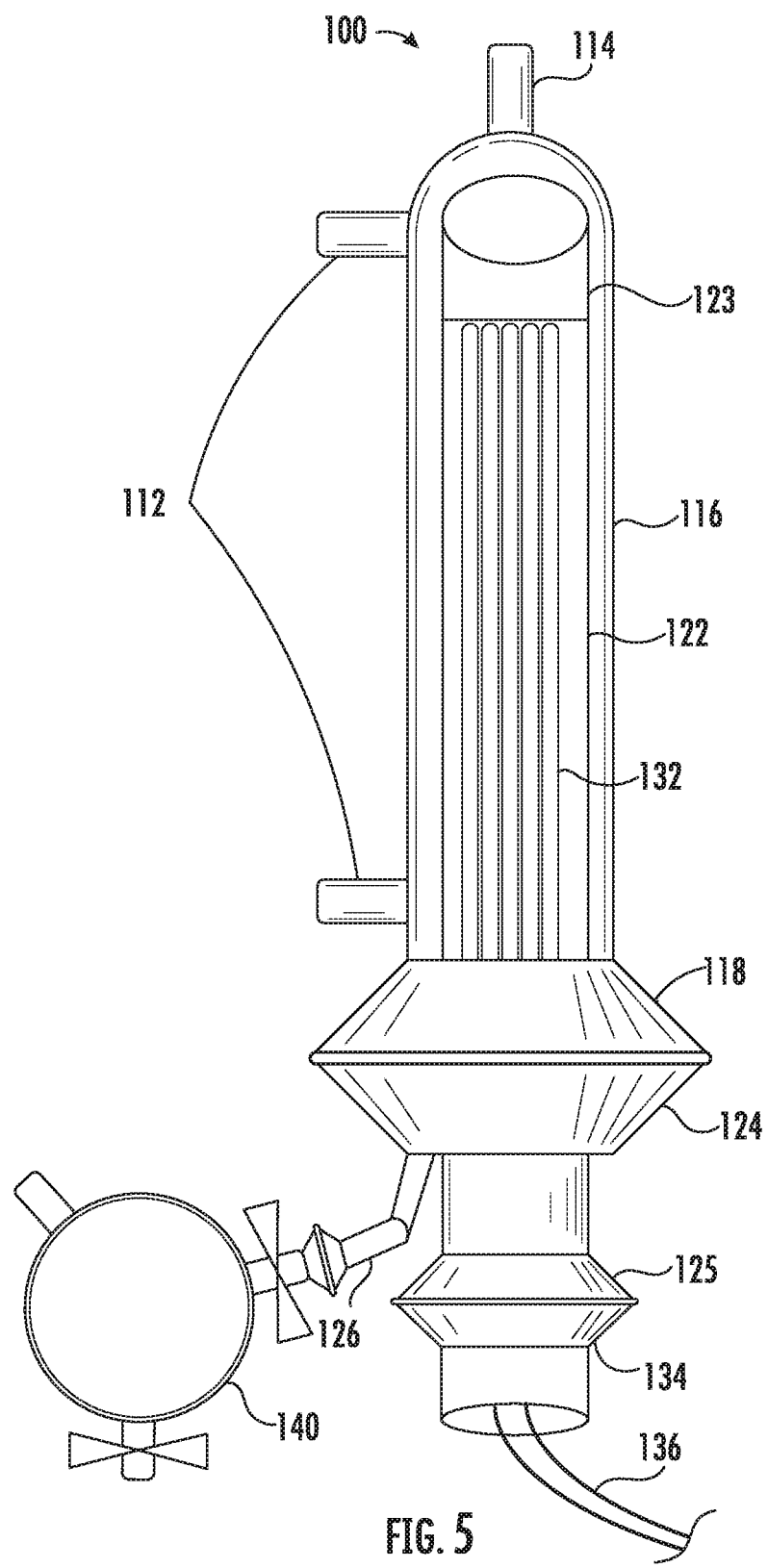
FIG. 5 is a schematic drawing of a close up of the heating element, evaporator tower, and evaporator glass of the falling film evaporator system, encapsulated together, as described hereinbelow, and connected to a concentrate receiving flask.

FIG. 4 illustrates the same features as FIG. 1D above, except FIG. 4 also illustrates that in some embodiments, the falling film evaporator system 100 of the present disclosure can also be used in conjunction with a concentrate receiving flask 140. As described above, the evaporator tower 120 can comprise one or more concentrate drain ports 126. FIG. 5 illustrates the heating element 130 at least partially inserted into the evaporator tower 120 and the evaporator tower 120 at least partially inserted into the evaporator glass 110. Also illustrated in FIG. 5, one or more of the concentrate drain ports 126 can be connected to a concentrate receiving flask 140. In some embodiments, all or some of the concentrate drain ports 126 can each be connected to a separate or discrete or corresponding concentrate receiving flask 140 or just one concentrate drain port 126 can be connected to a concentrate receiving flask 140. In some embodiments, as the sample liquid is evaporated by the falling film evaporator system 100 of the present disclosure, if some of the evaporated liquid does not make it out of the vapor outlets 112, the vapor might condense back into liquid form and need to be drained out of the concentrate drain port(s) 126. Additionally, some of the liquid falling down the evaporator tower 120 will not evaporate at all, in which case, the non-evaporated liquid will drain out of the concentrate drain port(s) 126 into the concentrate receiving flask 140. In addition to non-evaporated liquid, some solutions, after being evaporated will leave a concentrate and need to be drained. Thus, there is a need for one or more concentrate receiving flasks 140 to receive and contain the liquid as it drains.

Figure 6:
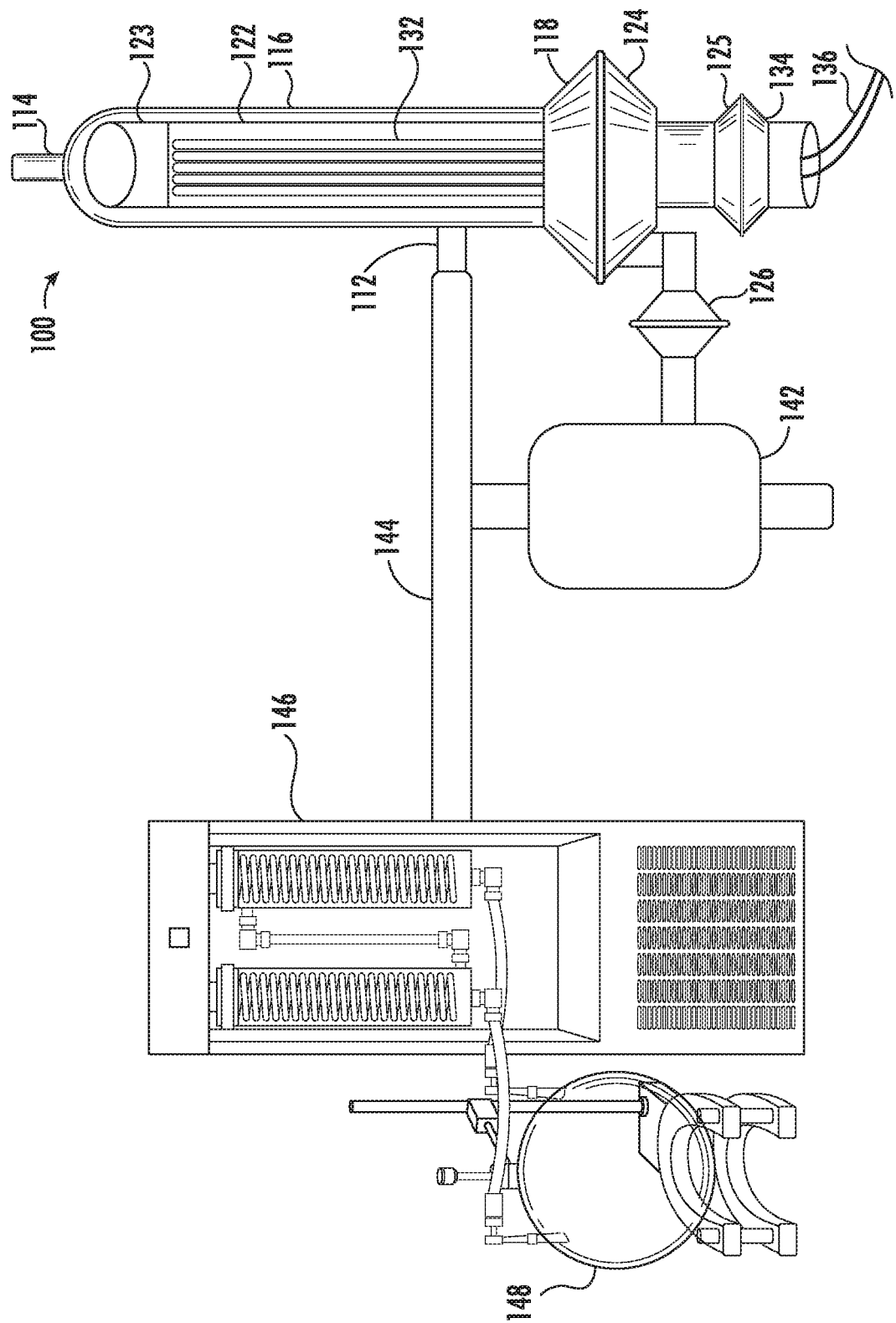
FIG. 6 is a schematic drawing of the heating element, evaporator tower, and evaporator glass of the falling film evaporator system, encapsulated together, as described hereinbelow, and connected to a separator and a condensing cooler.

FIG. 6 of the present disclosure illustrates that the one or more vapor outlets 112 can be connected to a cooling condenser or chiller 146 via connector 144, as shown on the left side of the figure. In some embodiments, the condenser or chiller 146 can be, for non-limiting example, of the type described in PCT International Patent Application Publication No. WO 2016/201223 A1, the disclosure of which is incorporated herein by reference in its entirety. In some embodiments, the condenser or chiller 146 can be, for non-limiting example, of the type described in PCT International Patent Application Publication No. WO 2018/187276 A1, the disclosure of which is incorporated herein by reference in its entirety. In some embodiments, as the vaporized sample liquid goes through the cooling condenser 146, it is again transformed into a liquid. The final liquid is then deposited into the drain flask 148. FIG. 6 also illustrates an exemplary falling film evaporator system 100 that comprises only one vapor outlet 112, versus a plurality of vapor outlets 112. Furthermore, in some embodiments, instead of a concentrate receiving flask, a separator 142 can be connected to the concentrate drain port 126 of the evaporator tower 120.

Figure 7:
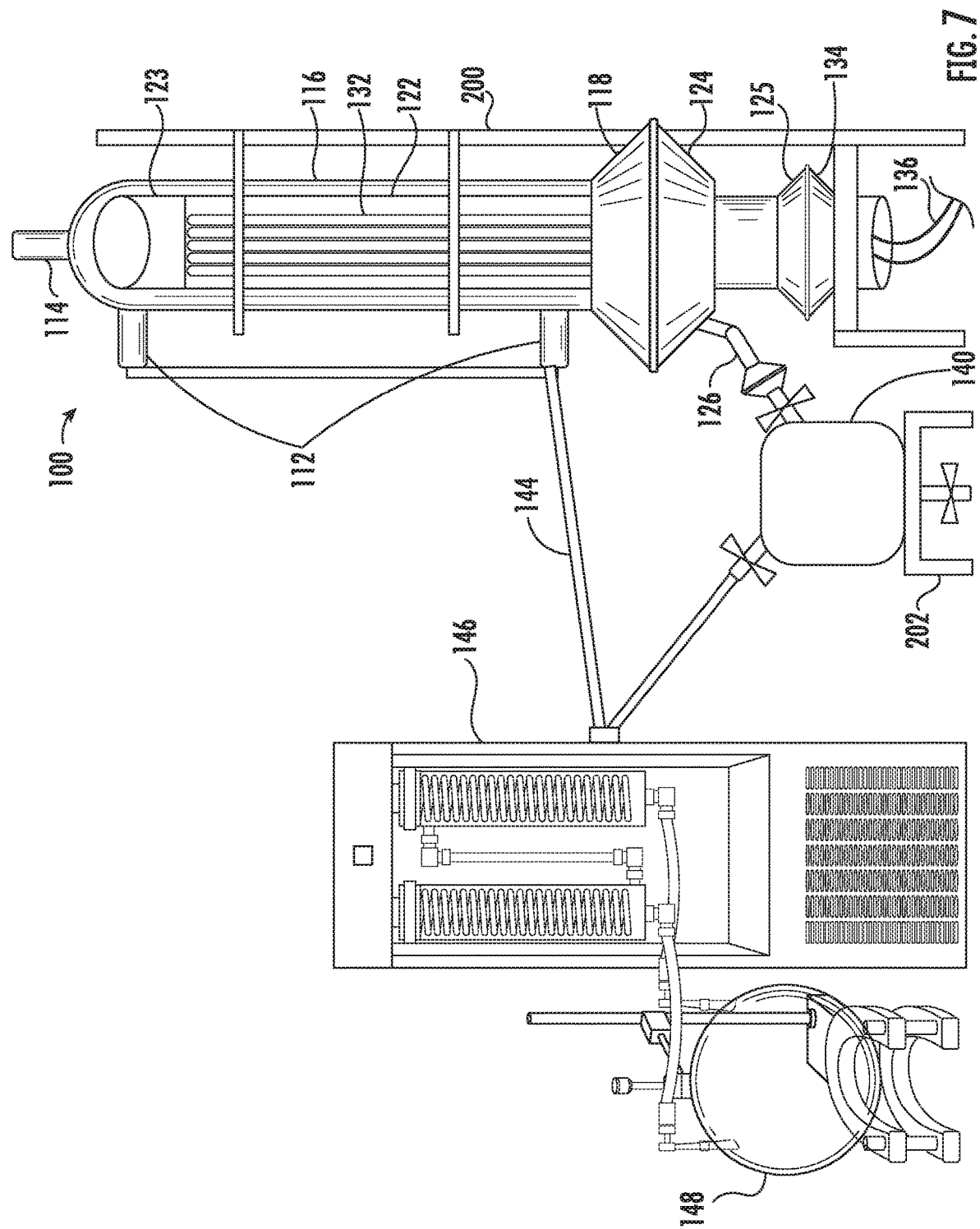
FIG. 7 is a schematic drawing of the heating element, evaporator tower, and evaporator glass of the falling film evaporator system, encapsulated together on a stand, as described hereinbelow, and connected to a concentrate receiving flask and a condensing cooler.

FIG. 7 of the present disclosure illustrates that in some embodiments, the falling film evaporator system 100 on the right, can be connected to a concentrate receiving flask 140 as described above and both of the one or more vapor outlet 112 connections can be connected to a cooling condenser 146 as described above. In such an embodiment, the vapor would exit the evaporator glass 110 through the vapor outlets 112 (one vapor outlet 112 closer to the top of the evaporator tower 120 and one closer to the bottom) and go through the cooling condenser 146. Additionally, in some embodiments, the falling film evaporator system 100 of the present disclosure can be held by a first stand 200, ensuring that the system 100 remains vertical during the evaporation process. Additionally, in some embodiments, the concentrate receiving flask 140 can be positioned and held by a second stand 202 as well.

Figure 8:
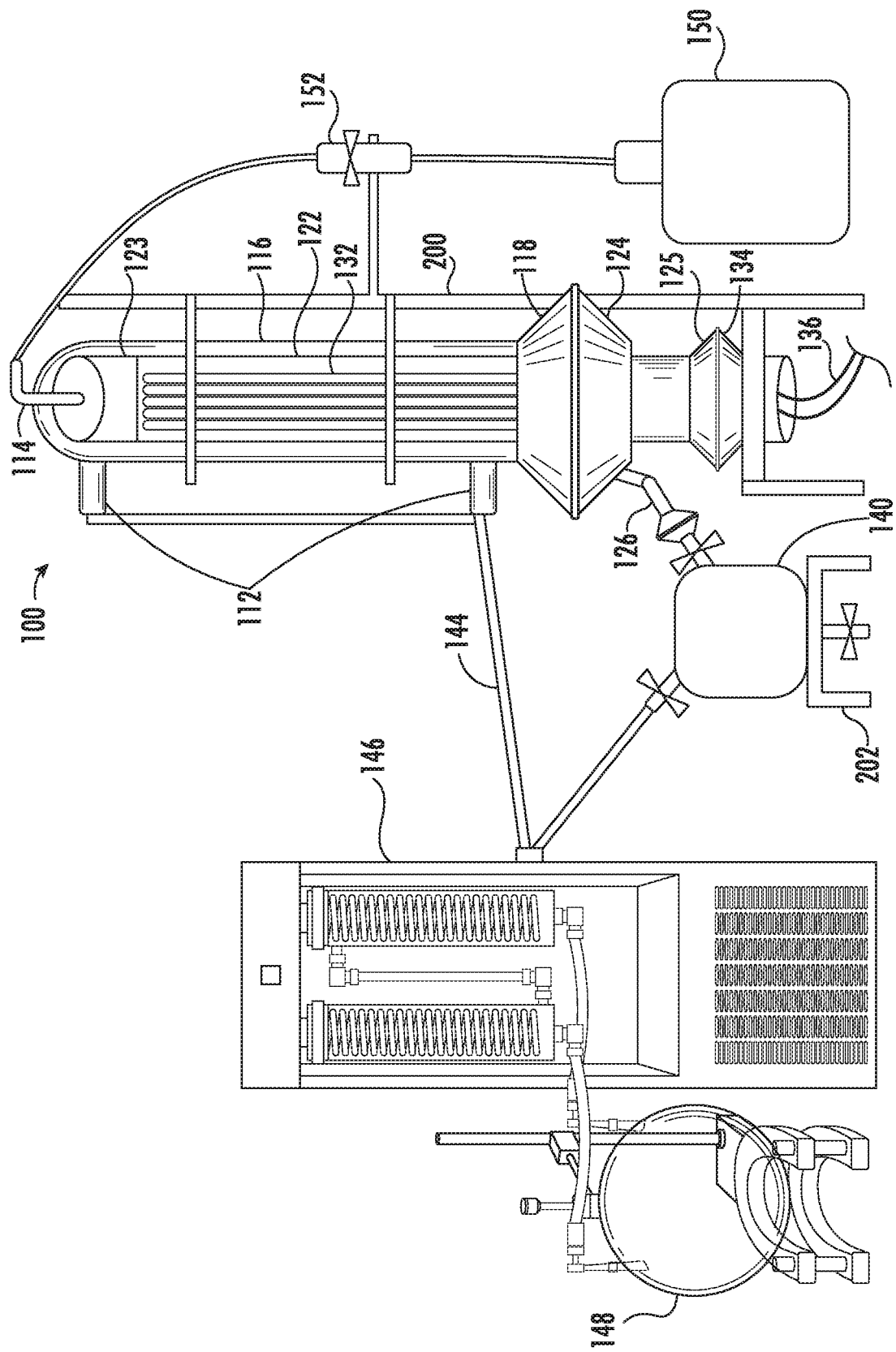
FIG. 8 is a schematic drawing of the heating element, evaporator tower, and evaporator glass of the falling film evaporator system, encapsulated together on a stand, as described hereinbelow, and connected to a concentrate receiving flask, a sample liquid container, and a condensing cooler.

Turning now to FIG. 8 of the present disclosure in some embodiments, the sample feed inlet 114 can be connected to a feed valve 152 and a container of sample liquid 150 connected to the feed valve 152. In some embodiments, the feed valve 152 can be configured to automatically turn on and off depending on a timer or depending on the amount of sample liquid left in the container 150. For example and without limitation, in some embodiments, the feed valve 152 can be configured such that it allows sample liquid to flow to the sample feed inlet 114 for a specific amount of time. In some further embodiments, the feed valve 152 can be configured such that it allows sample liquid to flow to the sample feed inlet 114 until a sensor determines that there is no more sample liquid left in the container 150 or that there is only a certain amount of sample liquid left in the container 150. For example and without limitation, the feed valve 152 can be configured to open and allow sample liquid to flow until the container 150 is half full, or until it only has a certain number of liters or milliliters of sample liquid left.

Figure 9:
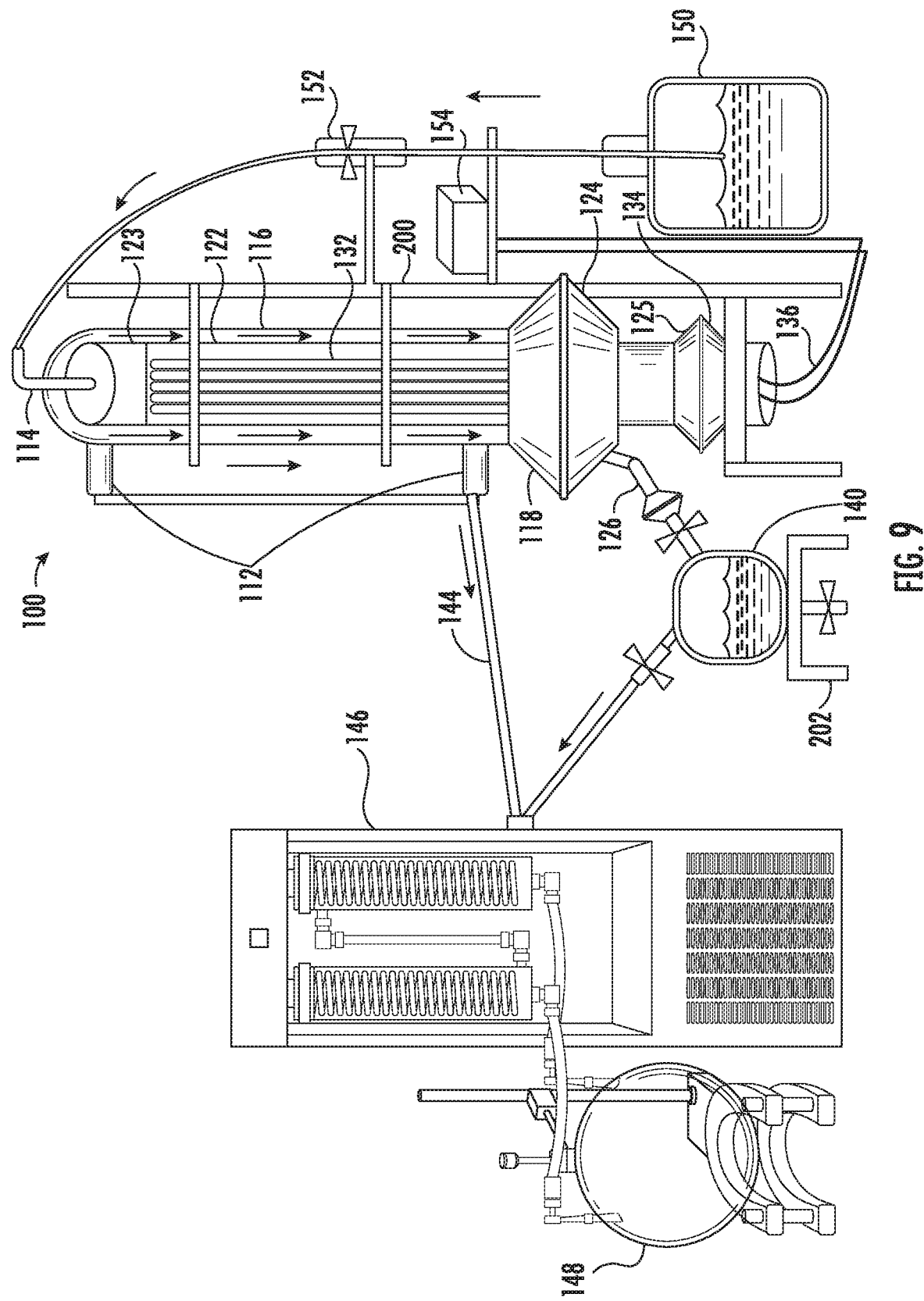
FIG. 9 is a schematic drawing of the heating element, evaporator tower, and evaporator glass of the falling film evaporator system, encapsulated together on a stand, as described hereinbelow, and connected to a concentrate receiving flask, a sample liquid container, a condensing cooler, and a controller for controlling various components of the falling film evaporator system.

FIG. 9 of the present disclosure illustrates how the falling film evaporator system 100 can operate in some embodiments. On the right side of FIG. 9, the container 150 of sample liquid is connected to the sample feed inlet 114 of the evaporator glass 110 and has the feed valve 152 connected therebetween. Furthermore, FIG. 9 illustrates that the heating element 130 is at least partially inserted into the evaporator tower 120 and the power cords 136 of the heating element 130 are connected to a controller 154. In some embodiments, the controller 154 is configured to control the operation of the heating element 130 as well as the vacuum pump described above (not shown in this illustration). In the illustrated configuration, the controller 154 is configured to operate the heating element 130, which when turned on, heats the coils 132 of the heating element 130, thereby also heating the body 122 of the evaporator tower 120. After the feed valve 152 is opened, which can be done manually, by a person, robot, or other user, or by the controller 154 or some other automated device using an actuator, the sample liquid flows up from the sample liquid container 150 to the sample feed inlet 114 and is deposited into the reservoir of the dispensing bowl 123. In some embodiments, as discussed herein below with respect to FIG. 10A-FIG. 11C, the sample liquid can be introduced to the falling film evaporator system 100 in various locations, including through the top at the sample feed inlet 114 or in an inlet tube from the bottom, or any other suitable location.

In some embodiments, the controller 154 described herein can comprise, for non-limiting example, one or more processors and a non-transitory computer readable medium comprising computer executable instructions. The computer executable instructions can comprise, for non-limiting example, instructions for operating the heating element 130, a vacuum pump, and/or other devices/components that can be added to the falling film evaporator system 100 of the present disclosure. Additionally, in some embodiments, the controller 154 can be configured to perform some or all of the automated features discussed herein. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform or may be distributed across multiple devices or computing platforms.

In some embodiments, the sample liquid is continuously deposited into the dispensing bowl 123 until the sample liquid overflows over the sides or edges of the dispensing bowl 123. As the sample liquid overflows over the edge of the dispensing bowl 123, a thin film of the sample liquid falls or flows down an outer surface of the body 122 of the evaporator tower 120. The heating element 130 can, in some embodiments, be in operation a sufficient amount of time prior to the feed valve 152 being opened such that the outer surface of the body 122 of the evaporator tower 120 is hot enough to at least partially evaporate the thin film of sample liquid falling or flowing down the outer surface of the body 122 of the evaporator tower 120.

In some embodiments, as the film of sample liquid falls or flows down the outer surface of the body 122 of the evaporator tower 120, the sample liquid is at least partially evaporated by at least the heat produced by the coils 132 of the heating element 130. In some embodiments, any vapors that are produced flow out the evaporator glass 110 through the vapor outlet connections 112 to the cooling condenser 146. Additionally, any concentrated sample liquid (concentrate) that makes its way to the bottom of the evaporator tower 120 exits the evaporator glass 110 and evaporator tower 120 through the concentrate outlet 126 to the concentrate receiving flask 140 as illustrated in FIG. 9.

Furthermore, as illustrated in FIG. 9, the concentrate receiving flask 140 is also connected to the cooling condenser 146 such that any vapors that are produced or received by the concentrate receiving flask 140 escape to the cooling condenser 146 as well. In some embodiments of the present disclosure, the controller 154 is configured to control at least the heat settings of the heating element 130. For non-limiting example, in some embodiments, the heating element 130 can be set to a temperature that would be high enough to evaporate the film of sample liquid flowing on the outside of the body 122 of the evaporator tower 120, but not so high that it wastes energy. In some embodiments, after the evaporated sample liquid reaches the cooling condenser 146, the vapor is turned back into a liquid by the cooling condenser 146 and the concentrate is collected in the receiving flask 148.

Figure 10A:
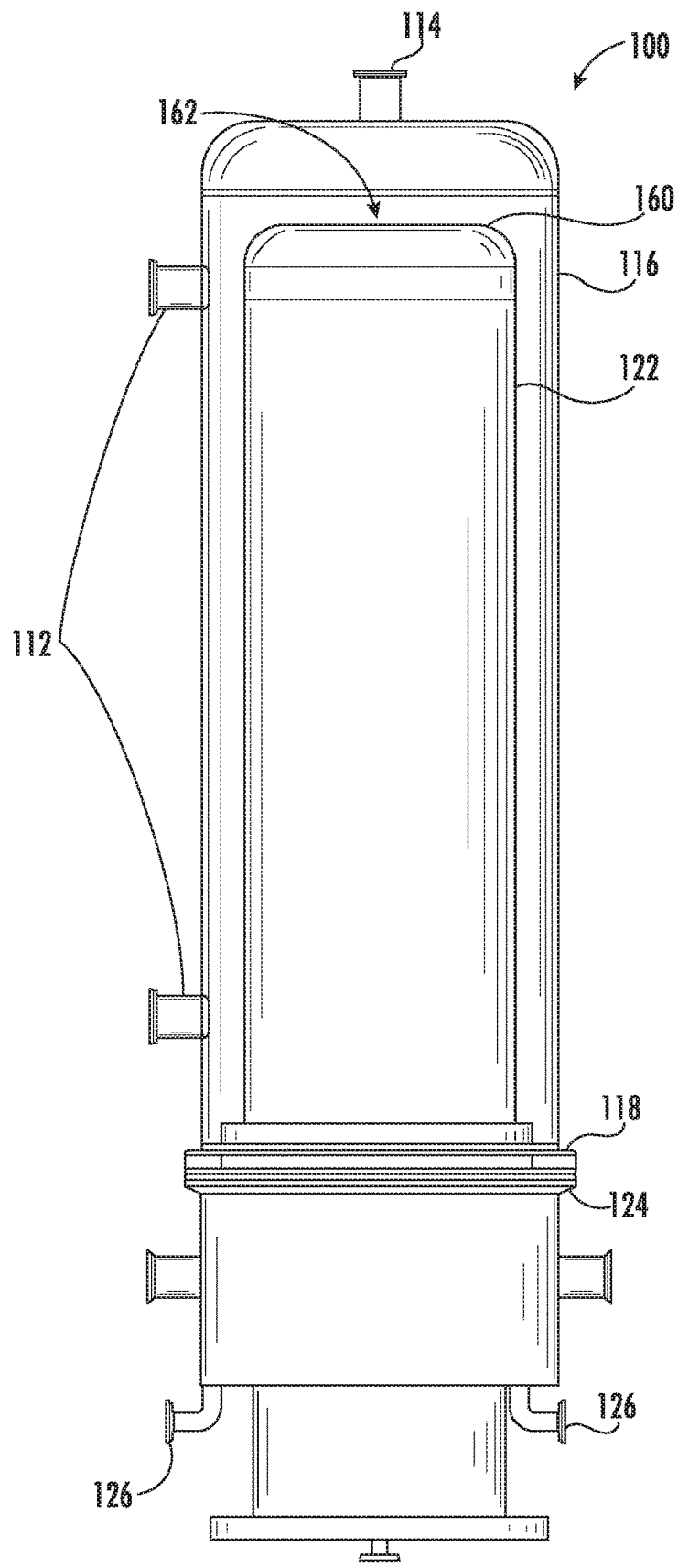
FIG. 10A and FIG. 10B are schematic drawings of an example falling film evaporator system of the present disclosure according to an alternative embodiment, wherein the evaporator is fed with liquid from the bottom, instead of from the top, as described hereinbelow.
Figure 10B:
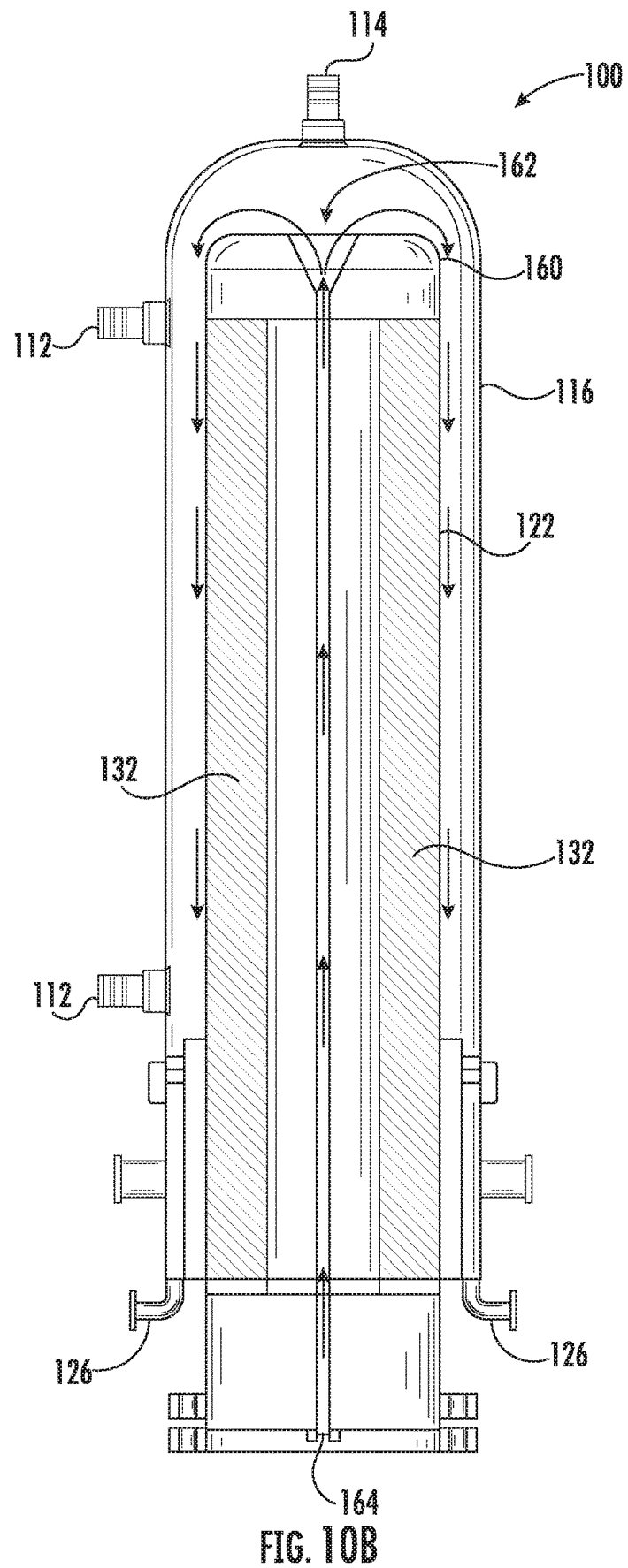

Turning now to FIG. 10A, which illustrates another example falling film evaporator system 100 according to an alternative embodiment of the present disclosure. In this alternative embodiment, the dispensing bowl 123 (see, e.g., FIG. 5) can be replaced by a dome cap 160 that has an egress hole 162 positioned near the center of the top of the dome cap 160. As illustrated by FIG. 10B, in this alternative embodiment, instead of the sample fluid being introduced to the falling film evaporator system 100 through the top of the evaporator glass body 116 via inlet 114 (in some embodiments inlet 114 can be excluded), the sample liquid is introduced from the bottom of the falling film evaporator system 100 by a central feeding tube 164. In some embodiments, central feeding tube 164 has a diameter that is less than or equal to the diameter of the egress hole 162 at the top of the evaporator tower body 122. Additionally, in some embodiments, the central feeding tube 164 is aligned with the egress hole 162, or rather, the termination of the central feeding tube 164, at the top of the dome cap 160, is the egress hole 162. In some embodiments, the central feeding tube 164 has a constant diameter. In other embodiments, the central feeding tube 164 has a smaller diameter for most of its length and then widens out to terminate at the egress hole 162 and has the same diameter of the egress hole 162 when the central feeding tube 164 terminates. In some embodiments, the central feeding tube 164 has a length that is equal to or greater than the length of the evaporator tower body 122. This allows the central feeding tube 164 to be fed in from the bottom of the falling film evaporator system 100. In any embodiment, the egress hole 162 is connected to or a part of the central feeding tube 164 and allows sample liquid be pumped into the falling film evaporator system 100.

Hereinbelow, the operating principle of this alternative embodiment remains the same. In this embodiment, the inlet 114 can be present or it can be removed. It remains present in this depiction for illustrative purposes showing that the falling film evaporator system 100 of the present disclosure can be retrofitted in multiple different ways. In other words, the parts and different components described hereinabove can be interchangeable as long as the constituent parts can operate together. In other words, the evaporator glass 116 that is used with the first embodiment discussed above comprising the dispensing bowl 123 can also be used with the evaporator tower body 122 described in FIG. 10B comprising the dome cap 160 and central feeding tube 164. Thus, artisans having ordinary skill in the art will appreciate that the falling film evaporator system 100 of the present disclosure can be embodied in many different forms and configurations.

In the embodiment described in FIG. 10B, as sample liquid is supplied to the central feeding tube 164 and it flows up to and out of the egress hole 162 the sample liquid begins to spill over the edges of the dome cap 160, as depicted by the flow arrows. The sample liquid then begins to fall down the sides of the evaporator tower body 122 and is heated by the heating element coils 132 and at least partially vaporized. In some embodiments, the heating element coils 132 can have a toroid shape, in effect surrounding the central feeding tube 164 on all sides. In some embodiments, there can be another cylinder of insulation between the heating element coils 132 and the central feeding tube 164. The insulation can be configured to keep the liquid flowing through the central feeding tube 164 cool enough such that it does not evaporate before it gets to the egress hole 162.

Figure 11A:
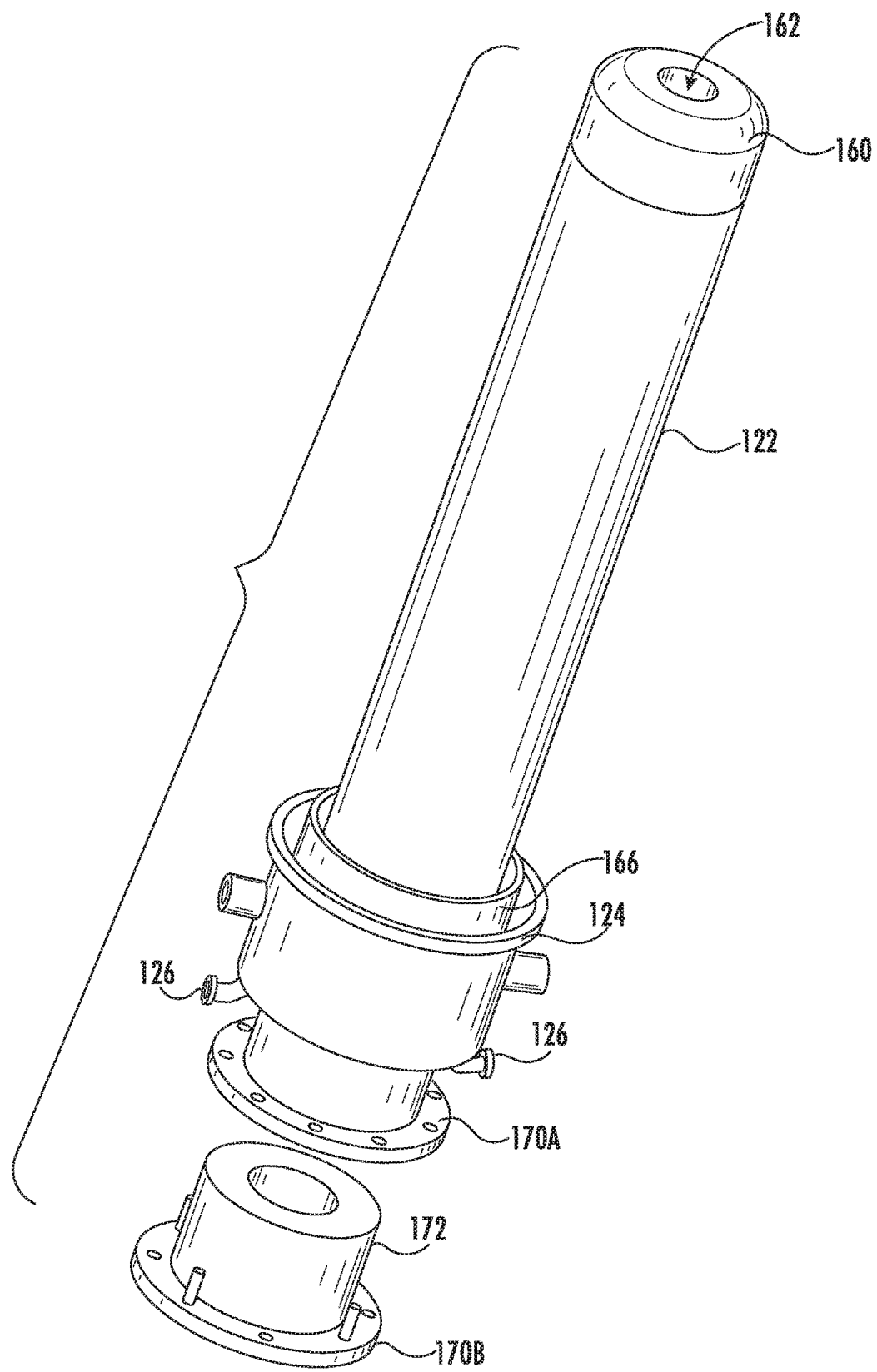
FIG. 11A, FIG. 11B, and FIG. 11C are schematic drawings illustrating several components and features of the evaporator tower according to the alternative embodiment of the present disclosure.

Turning now to FIG. 11A, which illustrates the different components of the evaporator tower body 122 in the alternative embodiment of falling film evaporator system 100 of the present disclosure. As depicted in the figure, the egress hole 162 in some embodiments, is centrally located at the top of the dome cap 160. Additionally, as shown in more detail in this figure, in some embodiments, the evaporator tower body 122 can include a collar 166 near its base. In some embodiments, the diameter of the collar 166 is greater than that of the evaporator tower body 122 but less than the diameter of the second flange 124. In effect the collar 166 continues down the evaporator tower body 122 and attaches around the bottom of the evaporator tower body 122 like a seal. In some embodiments, the collar 166 is configured to capture any residual sample liquid that is not evaporated as it flows down the evaporator tower body 122. Although it is not depicted in this view, as discussed above, the collar 166 attaches around the lower end of the evaporator tower body 122 and acts as a capturing device to make sure all of the non-evaporated sample liquid gets captured.

In some embodiments, the diameter of the outer edge of the second flange 124 is equal to an inner diameter of the evaporator glass body 116. In this way, the second flange 124 is configured to capture any condensate from vapor that has condensed on the inside of the evaporator glass body 116. As the liquid falls down the edge of the evaporator tower body 122 is evaporated by the heating element coils 132, the vapor takes the shape of the container it is in, i.e., the inside of the evaporator glass body 116. Thus, some of the vapor touches the inside surface of the evaporator glass body 116. The evaporator glass body 116 can be cooler than the area right closer to the heating element coils 132. Thus, it is possible that some of the vapor can be condensed again on the cooler, inside surface of the evaporator glass body 116. When the vapor condenses and begins to slide down the evaporator glass body 116, it runs over onto the second flange 124 and falls over the side of the second flange 124 between the collar 166 and the second flange 124. Much like the collar 166 continues down and connects to the evaporator tower body 122 and acts to capture any falling liquid that did not evaporate, the area between the second flange 124 and the collar 166 contains space to hold the condensate that condensed on the sides of the evaporator glass body 116. Thus, in sum embodiments, a portion of the evaporate, e.g., 10%, 20%, 30% or more, is collected before exiting the falling film evaporation and entering a chiller/condenser. At any time, the concentrate drain ports 126 are configured such that the condensed sample liquid, stored in the area between the second flange 124 and the collar 166, can be drained.

Furthermore, in some embodiments, the bottom of the falling film evaporator system 100 can include a support mounting base 172 for mounting onto lab infrastructure or other supporting equipment to support the falling film evaporator system 100. In some embodiments, the support mounting base 172 can be inserted into the bottom of the evaporator tower body 122 and attached via mounting flanges 170A and 170B.

Figure 11B:
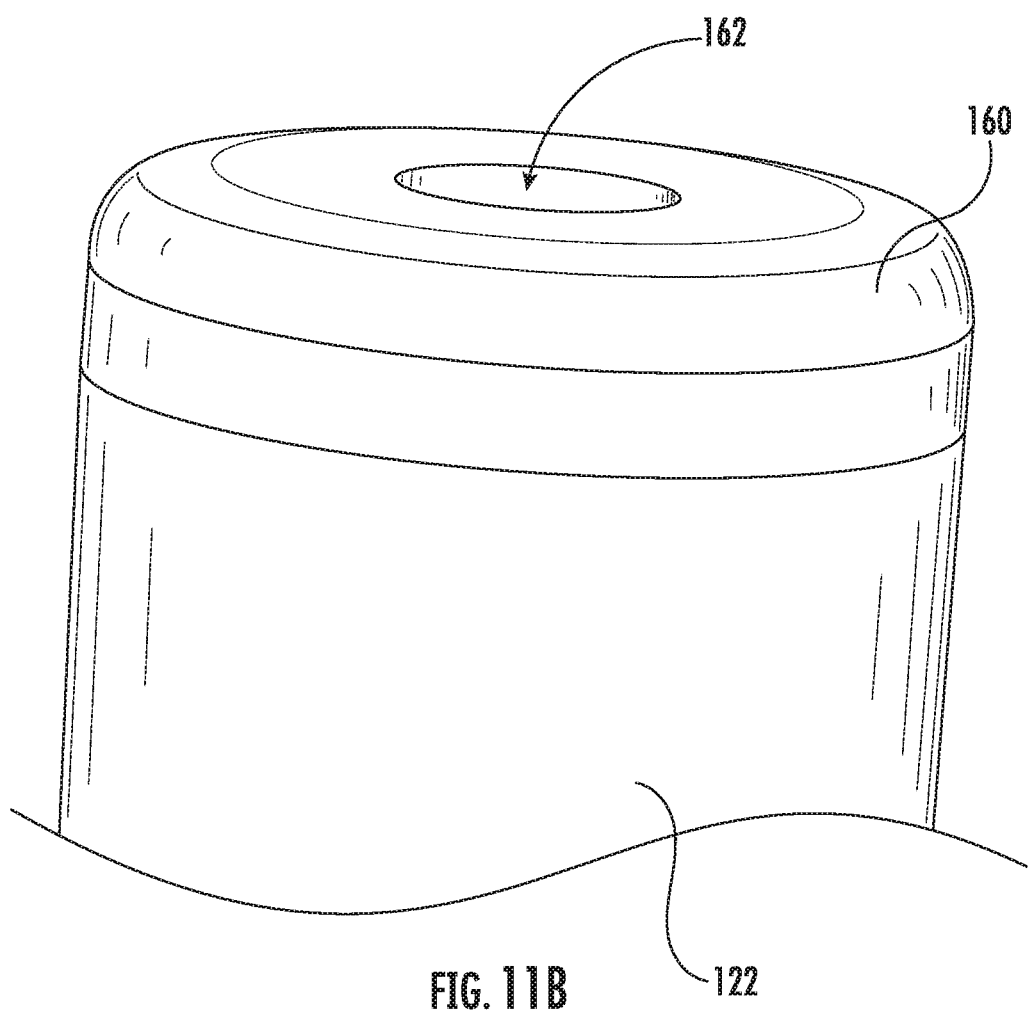

FIG. 11B illustrates a close-up view of the top of the evaporator tower body 122 in the alternative embodiment. It depicts the dome cap 160 and egress hole 162 and gives a bit more detail of the area where the sample fluid would flow and then spill over the sides of the dome cap 160 and down the evaporator tower body 122.

Figure 11C:
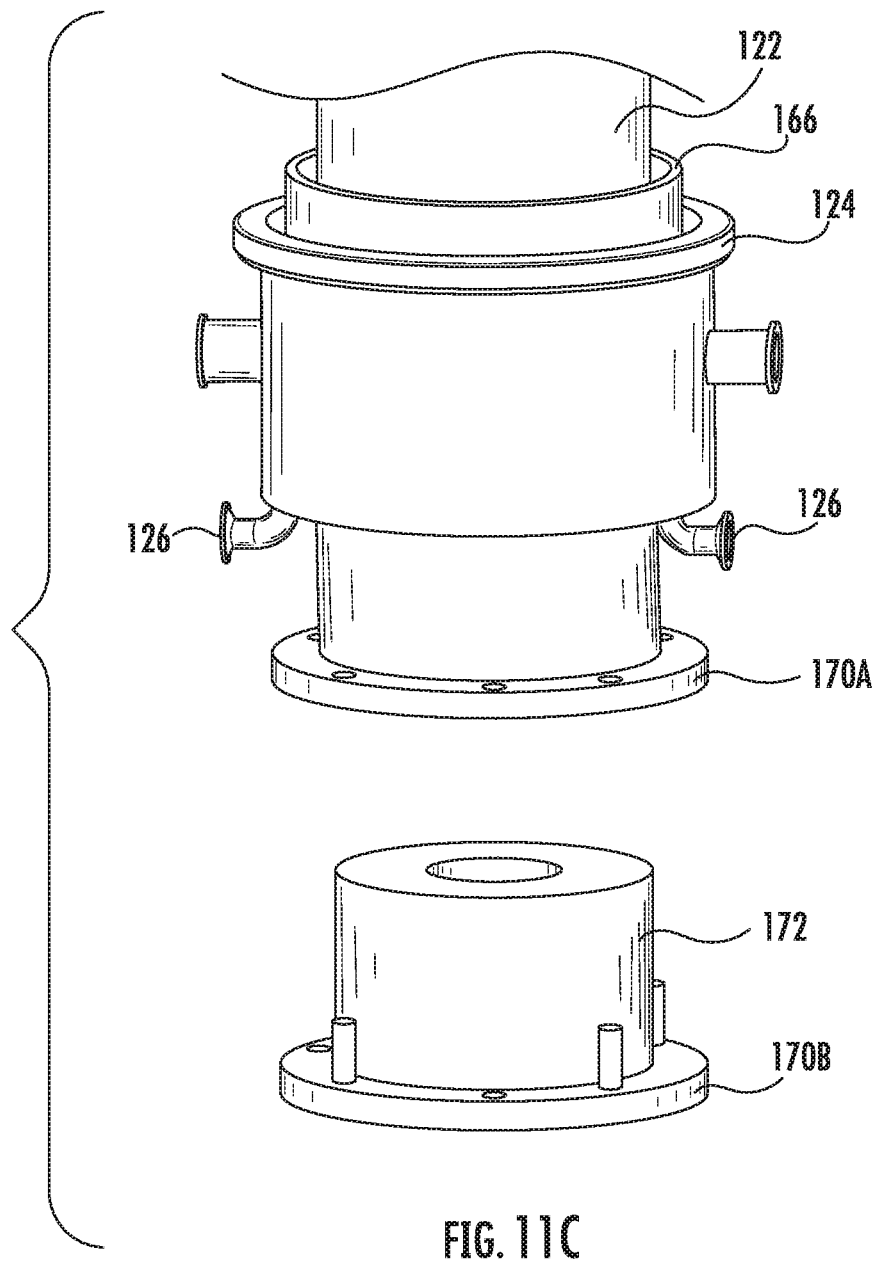

FIG. 11C illustrates a close-up view of the bottom of the evaporator tower body 122 in the alternative embodiment. It depicts the support mounting base 172 aligned with the bottom of the evaporator tower body 122. As described above, the support mounting base 172 can be used to attach the falling film evaporator system 100 to a lab structure and given the system more stability.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

What is claimed is:

1. A falling film evaporator system comprising:
   one or more sample feed inlets;
   an evaporator glass comprising one or more vapor outlets, and a first flange;
   an evaporator tower, wherein the evaporator comprises a second flange and a third flange and is positioned at least partially inside of the evaporator glass such that the first flange of the evaporator glass is positioned on top of the second flange of the evaporator tower and comprising:
      an evaporator body; and
      a dispensing bowl or an egress hole positioned on top of the evaporator body and between the evaporator body and a top inner surface of the evaporator glass; and
   a heating element, wherein the heating element comprises a fourth flange and is positioned at least partially inside of the evaporator body such that the third flange of the evaporator tower is positioned on top of the fourth flange of the heating element.

2. The falling film evaporator system of claim 1, wherein the evaporator tower comprises the dispensing bowl;
   wherein the one or more sample feed inlets is positioned on top of the evaporator glass and is configured to deposit sample liquid into a reservoir of the dispensing bowl.

3. The falling film evaporator system of claim 2, wherein the evaporator tower is configured such that upon an overflow of the sample liquid in the dispensing bowl, the sample liquid falls along an outer surface of the evaporator body.

4. The falling film evaporator system of claim 1, wherein the evaporator tower comprises the egress hole;
   wherein the egress hole is fed by the one or more sample feed inlets which are located at a bottom portion of the evaporator tower.

5. The falling film evaporator system of claim 4, wherein the evaporator tower is configured such that upon an overflow of sample liquid out of the egress hole, the sample liquid falls along an outer surface of the evaporator body.

6. The falling film evaporator system of claim 1, wherein the evaporator tower further comprises a collar configured to capture any sample liquid that is falling along the outer surface of the evaporator body that does not evaporate; and
   wherein the second flange is configured to capture any liquid that is sliding or falling down the evaporator glass.

7. The falling film evaporator system of claim 1, wherein the heating element is configured to heat the evaporator body such that sample liquid falling along an outer surface of the evaporator body is at least partially evaporated.

8. The falling film evaporator system of claim 1 further comprising:
   one or more concentrate drain ports; and
   one or more concentrate receiving flasks, or one or more separators connected to one or more of the concentrate drain ports.

9. The falling film evaporator system of claim 1 wherein at least one of the one or more vapor outlets is connected to a condenser.

10. The falling film evaporator system of claim 1, further comprising:
    a vacuum pump; and
    a controller comprising one or more processors configured to control one or more components of the evaporator glass, the evaporator tower, the heating element, or the vacuum pump.

11. The falling film evaporator system of claim 1, wherein the evaporator tower and the evaporator glass are configured to be sealed and unsealed to create a vacuum chamber.

12. A method for evaporating a sample liquid comprising:
    providing an evaporator glass comprising one or more vapor outlets, and a first flange;
    providing an evaporator tower, wherein the evaporator comprises a second flange and a third flange and is positioned at least partially inside of the evaporator glass such that the first flange of the evaporator glass is positioned on top of the second flange of the evaporator tower and comprising:
       an evaporator body; and
       a dispensing bowl or an egress hole positioned on top of the evaporator body and between the evaporator body and a top inner surface of the evaporator glass;
    dispensing the sample liquid from one or more sample feed inlets into a reservoir of the dispensing bowl or dispensing the sample liquid from the egress hole, wherein the evaporator body is configured such that the sample liquid can overflow and fall along an outer surface of the evaporator body; and
    heating the evaporator body with a heating element, wherein the heating element comprises a fourth flange and is positioned at least partially inside of the evaporator body such that the third flange of the evaporator tower is positioned on top of the fourth flange of the heating element wherein the sample liquid is at least partially evaporated as the sample liquid falls along the outer surface of the evaporator body.

13. The method of claim 12, wherein the evaporator tower comprises the dispensing bowl; and wherein the one or more sample feed inlets are positioned on top of the evaporator glass.

14. The method of claim 12, wherein the evaporator tower comprises the egress hole; and
wherein the egress hole is fed by the one or more sample feed inlets which are located at a bottom portion of the evaporator body.

15. The method of claim 12 further comprising:
providing the evaporator tower with one or more concentrate drain ports; and
connecting one or more concentrate receiving flasks or one or more separators to one or more of the concentrate drain ports.

16. The method of claim 12 further comprising connecting at least one of the one or more vapor outlets to a condenser.

17. The method of claim 12 further comprising:
using a vacuum pump to seal and unseal the evaporator tower and the evaporator glass to create a vacuum chamber; and
using a controller comprising one or more processors to control one or more components of the evaporator glass, the evaporator tower, the heating element, or the vacuum pump.

18. A falling film evaporator system comprising:
one or more sample feed inlets;
an evaporator glass comprising:
    a first flange; and
    one or more vapor outlets;
an evaporator tower positioned at least partially inside of the evaporator glass and comprising:
    an evaporator body;
    a dispensing bowl or an egress hole positioned on top of the evaporator body, between the evaporator body and a top inner surface of the evaporator glass, and further positioned such that the one or more sample feed inlets can:
        dispense a sample liquid into a reservoir of the dispensing bowl; or
        feed a sample liquid through the egress hole and from a single sample feed inlet at the bottom of the evaporator tower;
    a second flange and a third flange; and
    one or more concentrate drain ports;
    wherein the evaporator tower is positioned at least partially inside of the evaporator glass such that the first flange of the evaporator glass is positioned on top of the second flange of the evaporator tower;
a heating element positioned at least partially inside of the evaporator body and comprising a fourth flange, wherein the heating element is positioned at least partially inside of the evaporator body such that the third flange of the evaporator tower is positioned on top of the fourth flange of the heating element;
a vacuum pump configured to seal and unseal the evaporator tower and the evaporator glass to create a vacuum chamber;
a controller comprising one or more processors, in communication with one or more the heating element or the vacuum pump, and configured to control the heating element or the vacuum pump or both;
a cooling condenser connected to a first concentrate receiving flask via a first connection and the evaporator glass via the one or more vapor outlets; and
a second concentrate receiving flask, or a separator connected to the concentrate drain port and the cooling condenser via a second connection;
wherein the evaporator tower is configured such that upon an overflow of sample liquid in the dispensing bowl or the egress hole, the sample liquid falls along an outer surface of the evaporator body; and
wherein the heating element is configured to heat the evaporator body such that the sample liquid falling along the outer surface of the evaporator body is at least partially evaporated.

* * * * *